US010662761B2

(12) United States Patent
Ameen

(10) Patent No.: US 10,662,761 B2
(45) Date of Patent: May 26, 2020

(54) EVALUATION OF CASED HOLE PERFORATIONS IN UNDER-PRESSURED GAS SAND RESERVOIRS WITH STONELEY WAVE LOGGING

(71) Applicant: Saudi Arabian Oil Company, Dhahran (SA)

(72) Inventor: Mohammed S. Ameen, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 76 days.

(21) Appl. No.: 15/648,741

(22) Filed: Jul. 13, 2017

(65) Prior Publication Data

US 2019/0017369 A1    Jan. 17, 2019

(51) Int. Cl.
*E21B 47/10* (2012.01)
*G01V 1/30* (2006.01)
(Continued)

(52) U.S. Cl.
CPC ............ *E21B 47/101* (2013.01); *E21B 43/11* (2013.01); *E21B 47/00* (2013.01); *E21B 47/082* (2013.01); *E21B 49/00* (2013.01); *G01V 1/286* (2013.01); *G01V 1/305* (2013.01); *G01V 1/306* (2013.01); *G01V 1/46* (2013.01); *G01V 1/50* (2013.01); *G01V 2210/121* (2013.01); *G01V 2210/1299* (2013.01); *G01V 2210/1429* (2013.01);
(Continued)

(58) Field of Classification Search
CPC ....... E21B 47/091; E21B 47/101; G01V 1/46; G01V 1/50
See application file for complete search history.

(56) References Cited

U.S. PATENT DOCUMENTS 3,312,934 A    4/1967 Stripling et al.
4,168,483 A    9/1979 Parthasarathy et al.
(Continued)

FOREIGN PATENT DOCUMENTS

WO    2009073520 A1    6/2009

OTHER PUBLICATIONS

Escandon, C., et al; "Detecting and characterizing fractures in sedimentary deposits with stoneley waves"; CT&F—Ciencia, Tecnologia y Futuro—vol. 4 No. 2 Dec. 2010; pp. 7-19.
(Continued)

*Primary Examiner* — Giovanna C Wright
(74) *Attorney, Agent, or Firm* — Bracewell LLP; Constance G. Rhebergen; Albert B. Kimball, Jr.

(57) ABSTRACT

Production capability of cased hole perforations in a cased completed well lined with a casing in an under-pressured gas producing reservoir is tested. A sonde of a dipole shear or array sonic (full waveform) acoustic well logging tool is moved in a well bore of the cased completed well in the reservoir across a depth interval of interest, which covers cased hole perforations zones in the reservoir. The well logging sonde has in it an acoustic energy source and acoustic energy receivers. Responses are logged at depth intervals of interest to the transit of Stoneley waves along the casing walls from the acoustic energy source to the acoustic energy receivers. Measures of characteristics (e.g., travel time and attenuation) of the Stoneley wave are obtained. The responses are then processed to indicate production capability of the cased hole perforations.

7 Claims, 6 Drawing Sheets

(51) Int. Cl.
*G01V 1/28* (2006.01)
*E21B 47/08* (2012.01)
*E21B 49/00* (2006.01)
*E21B 47/00* (2012.01)
*E21B 43/11* (2006.01)
*G01V 1/46* (2006.01)
*G01V 1/50* (2006.01)

(52) U.S. Cl.
CPC .. *G01V 2210/47* (2013.01); *G01V 2210/6222* (2013.01); *G01V 2210/6226* (2013.01)

(56) References Cited

U.S. PATENT DOCUMENTS

| | | | |
|---|---|---|---|
| 4,797,859 | A | 1/1989 | Hornby |
| 4,870,627 | A | 9/1989 | Hsu et al. |
| 5,130,949 | A | 4/1992 | Kan et al. |
| 5,218,573 | A * | 6/1993 | Katahara .......... E21B 47/08 367/32 |
| 5,331,604 | A * | 7/1994 | Chang .............. G01V 1/005 367/31 |
| 5,616,840 | A | 4/1997 | Tang |
| 5,687,138 | A | 11/1997 | Kimball et al. |
| 5,784,333 | A | 7/1998 | Tang et al. |
| 6,327,538 | B1 | 12/2001 | Chin |
| 7,066,266 | B2 * | 6/2006 | Wilkinson .......... E21B 33/138 166/250.1 |
| 7,813,219 | B2 | 10/2010 | Dubinsky et al. |
| 7,830,744 | B2 | 11/2010 | Wu et al. |
| 8,553,493 | B2 | 10/2013 | Wu et al. |
| 9,176,250 | B2 | 11/2015 | Sinha et al. |
| 9,476,998 | B2 | 10/2016 | Sinha |
| 9,494,705 | B2 | 11/2016 | Sinha |
| 9,557,440 | B2 | 1/2017 | Dorovsky et al. |
| 2007/0045006 | A1 * | 3/2007 | Krueger .............. E21B 21/08 175/25 |
| 2009/0145600 | A1 | 6/2009 | Wu et al. |
| 2015/0198032 | A1 | 7/2015 | Sinha et al. |

OTHER PUBLICATIONS

Paillet, F.L., et al; "Acoustic modes of propagation in the borehole and their relationship to rock properties", 1984, Geophysics, 47, pp. 1215-1228.

Qobi, L., et al.; "Permeability Determination from Stoneley Waves in the Ara group carbonates", 2001, Oman. GeoArabia 6 (4); pp. 649-666.

The International Search Report and Written Opinion for related PCT application PCT/US2018/039566 dated Sep. 17, 2018.

Medlin et al., "Fracture Diagnostics With Tube-Wave Reflection Logs", Journal of Petroleum Technology, Society of Petroleum Engineers; 1994, pp. 239-248.

* cited by examiner

EVALUATION OF CASED HOLE PERFORATIONS IN UNDER-PRESSURED GAS SAND RESERVOIRS WITH STONELEY WAVE LOGGING

BACKGROUND OF THE INVENTION

1. Field of the Invention

The present invention relates to the exploration and production of hydrocarbons from subsurface formations, and more specifically to evaluation of the adequacy or suitability of perforations in cased wellbores in under-pressured gas reservoirs.

2. Description of the Related Art

Accurate production testing or hydro-fracturing completion for a cased well in an under-pressured sand reservoir depends largely on the presence of effective perforations through the well casing to access the reservoir. An under-pressured reservoir is one in which formation fluid or gas pressure in the formation rock matrix is below hydrostatic fluid pressure (0.465 psi/ft. of well depth) at the formation depth of interest. In formations where the rock matrix is a sand, the reservoir gas is produced by perforations formed through casing and cement and into an outer veneer of the rock matrix around the wellbore. The perforations are formed to reach a fresh part of the reservoir that has not been damaged, such as by the process of boring or due to drilling fluids invasion. Collapsed perforations or perforations that are not effectively communicating gas from the formation into cased completed well are a source of uncertainty in the production tests. Test results may erroneously indicate lower production capacity of the reservoir if the effects of collapsed or ineffective perforations are not taken into account.

Conventional testing in under-pressured sand reservoirs are not considered satisfactory in diagnosis of effectiveness of perforations in the reservoirs, as they are not adequately sensitive, and lack sufficient resolution. So far as is known, there is no precise technique performable at depth in under-pressured sand reservoirs to verify the presence of effective perforations prior to the well testing or hydro-fracturing.

Stoneley waves are a type of large-amplitude interface, or surface, waves generated by a well logging tool in a well borehole. Stoneley waves can propagate along a solid-fluid interface, such as along the walls of a fluid-filled borehole, and are a main low-frequency component of signals generated by acoustic energy sources in boreholes. Analysis of Stoneley waves can allow estimation of the locations of fractures and permeability of the formation.

So far as is known, prior art involving Stoneley waves have involved assessing formation intrinsic permeability of subsurface formations adjacent borehole walls. Since interest was focused on the properties of the formation rock, the Stoneley waves were of necessity applied directly to the formation walls in what are known as "open hole" wells, where no well casing had been installed. These techniques were inapplicable and not appropriate for use if well casing cemented in place inside the subsurface formation borehole walls became a feature of interest after being completed by perforations to reach the fresh reservoir for production test.

Prior art for estimating formation parameters involved, so far as is known, forming such estimates as fluid exited into a well bore of an actual drilled or a planned well. Since the presence of an outgoing, flowing fluid was required, this prior art would not lend itself for use in situations where the production capability of casing perforations was uncertain or unknown.

SUMMARY OF THE INVENTION

Briefly, the present invention provides a new and improved method of testing production capability of cased hole perforations in a cased completed well lined with a casing in a gas producing reservoir. A well logging sonde is moved in a well bore of the cased completed well in the reservoir across a depth interval of interest, which covers cased hole perforations zones in the reservoir. The well logging sonde has in it an acoustic energy source and acoustic energy receivers.

Acoustic energy waves are imparted from the acoustic energy source in the sonde at the depth interval of interest to travel along walls of the casing in the cased completed well. The acoustic energy receivers sense the time of travel of the imparted acoustic energy waves along the walls of the casing in the cased completed well. The acoustic energy receivers also sense the amplitude of the acoustic energy waves along the walls of the casing in the cased completed well.

A measure is obtained of the slowness of travel of the imparted acoustic energy waves along the walls of the casing in the cased completed well at the depth interval of interest. A measure is obtained of the attenuation of the imparted acoustic waves along the walls of the casing in the cased completed well at the depth interval of interest, and a measure is obtained of the reflection coefficient of the imparted acoustic waves along the walls of the casing in the cased completed well at the depth interval of interest.

The production capability of the cased hole perforations at the formation depths of interest is determined based on the obtained measure of the attenuation of the imparted acoustic waves along the walls of the casing in the cased completed well at the depth interval of interest, and also on the obtained measure of the reflection coefficient of the imparted acoustic waves along the walls of the casing in the cased completed well at the depth interval of interest. Remedial steps are then taken in the cased completed well based on the determined production capability of the cased hole perforations at the formation depths of interest.

DETAILED DESCRIPTION OF THE PREFERRED EMBODIMENTS

Figure 1:
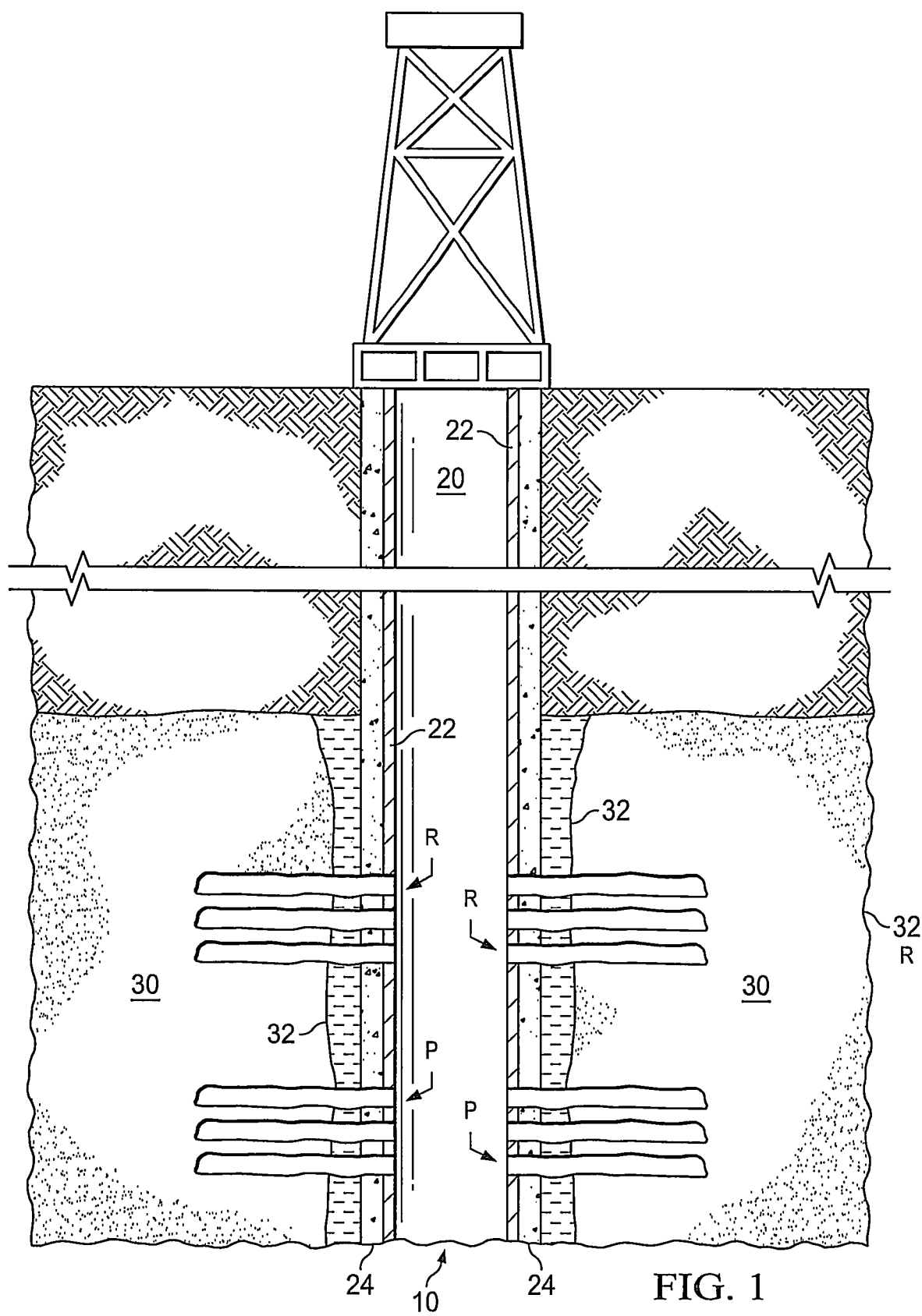
FIG. 1 is a schematic diagram of a cased wellbore of a completed well in an under-pressured gas producing reservoir.

The present invention provides a new and improved method of testing production capability of cased hole perforations in a well 10 (FIGS. 1 and 2) in a gas producing reservoir R. The gas producing reservoir R is an under-pressured one, in which fluid pressure in the rock matrix of the reservoir formation is lower than hydrostatic pressure at the depth of the well 10 adjacent the formation. An acoustic or sonic well logging system L is shown in FIG. 2 in the well 10. A sonde 12 containing an acoustic energy source 14 and a suitable number of sonic or acoustic energy receivers 16. The acoustic energy receivers 16 spaced longitudinally from each other and from the source 14 axially within the sonde 12. The sonde 12 is moved by a conductive wireline cable 18 in a well bore 20 to obtain the responses to the travel of the imparted acoustic energy wavelets from the source 12 along an interface between well fluids and the walls of steel casing 22 lining the well bore 20. During the well logging runs, the sonde 12 and cable 18 are suitably supported such as by a sheave wheel.

Preferably, the logging system well tool S is a dipole shear or array sonic (full waveform) logging tool. A number of suitable acoustic logging tools of this type may be used for this purpose according to the present invention.

Figure 2:
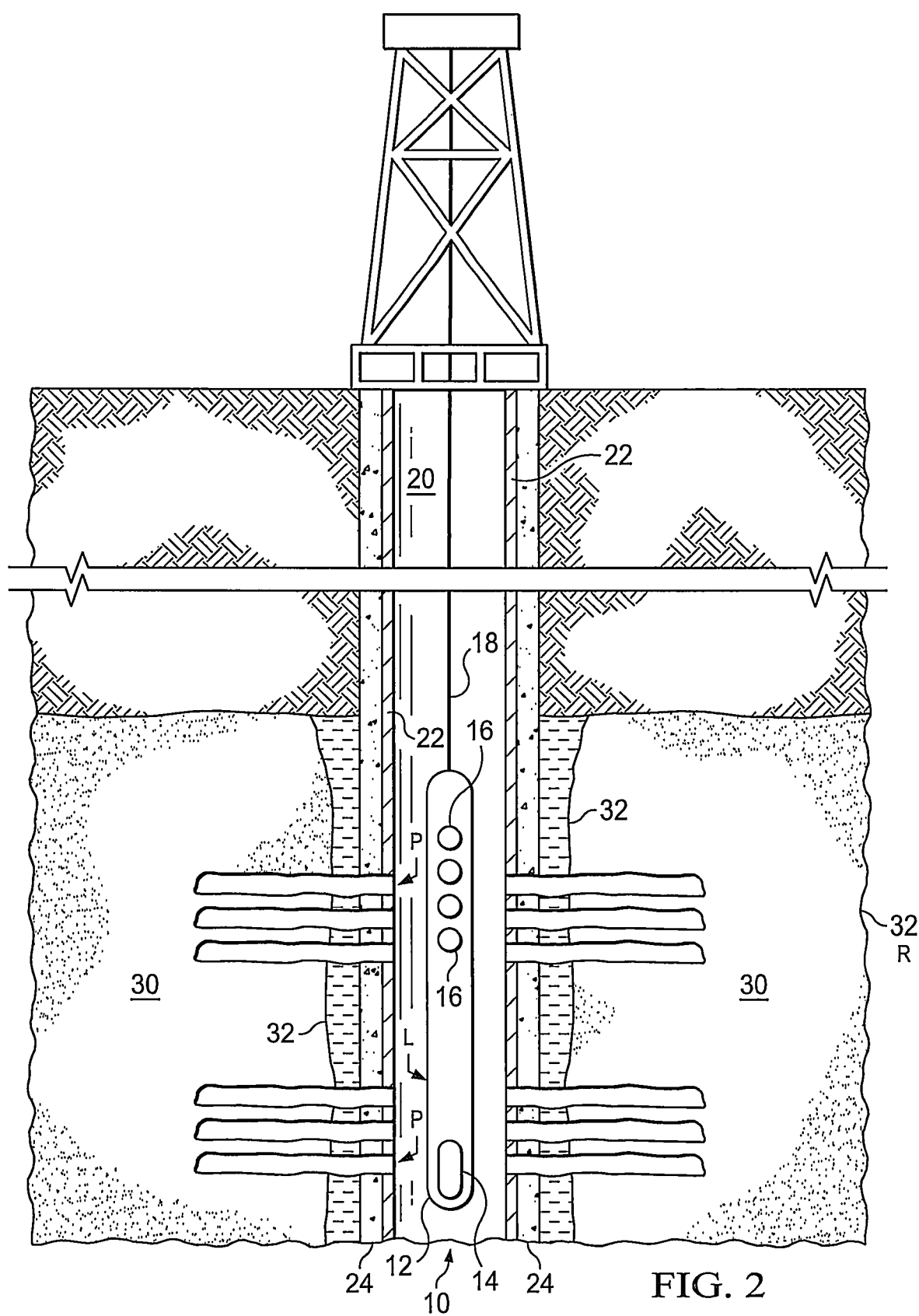
FIG. 2 is a schematic diagram of a well logging tool according to the present invention to obtain measures indicative of Stoneley wave travel characteristics along walls of the casing in the in the cased wellbore of FIG. 1.

The well 10 is as shown in FIGS. 1 and 2 a cased, completed well with walls of the well bore 20 lined by the steel casing 22. The casing 22 is, as indicated at 24, cemented in place in the well bore 20 along its extent through the well 10. As shown at P, suitable cased hole perforations P are formed in the casing 22, cement 24, and reservoir formation 26 at depths of interest in the wellbore 20 over an interval of interest for gas production from the reservoir R. The perforations P form flow passages to a fresh part of the reservoir indicated at 30 of the reservoir R that has not been damaged during drilling, and allow for flow of gas from the reservoir formation 26 into the well 10. An annular damaged zone of the formation indicated at 32 is formed surrounding the casing 22 and cement 24 due to well boring and drilling action and by drilling fluids invasion.

In some wells, certain of the perforations P are what are termed collapsed perforations which do not effectively communicate gaseous flow into the well bore 10 from the reservoir R. This can be the result of formation debris blocking a perforation passage. Collapsed perforations or other perforations that are not effectively communicating from the formation into the cased, completed well 10 are a source of uncertainty in production tests of the capacity of the reservoir to produce gas.

In the operation of the present invention, the well logging sonde 12 (FIG. 2) is moved in the cased, completed well 10 in the reservoir R to an interval of interest for gas production at the depths of the cased-hole perforations P in the formation. Acoustic energy is imparted with the acoustic energy source 14 in the sonde 12 as the sonde 12 travels across the depth interval of interest in the well bore. The emitted acoustic energy travels into the well 10 and along walls of the interface between well fluids and the walls of the casing 22. The acoustic energy receivers 16 in the sonde 12 sense the time of travel of the imparted acoustic energy along the walls of the casing 22, and the amplitude of the received waves of acoustic energy.

The portions of the imparted sonic or acoustic energy of interest for the present invention take the form of what are known as Stoneley waves, as indicated by a waveform shown schematically at 40. The present invention utilizes Stoneley waves logging to detect effectiveness or production capability of the perforations P in the casing 22 lining the well 10 in the reservoir R. The present invention is based on recorded characteristics of the Stoneley waves (e.g., travel time) from a dipole shear or array sonic (full waveform) acoustic log using the set of acoustic energy receivers or sensors 16.

As the Stoneley waves travel along portions of the casing 22 where no perforations are present, the acoustic energy present in the waves does not undergo noticeable or meaningful attenuation and slowness anomalies. However, when acoustic energy in the traveling Stoneley waves passes across an open perforation P which is connected to the undamaged part 30 of reservoir R, the waves are significantly perturbed. The physical effect of perturbation or disturbance results from a pressure imbalance which exists between the well 10 and the reservoir R. This phenomenon of perturbation or disturbance results in excess attenuation of the Stoneley direct waves and excess slowness (decreased velocity) of such waves. The perturbation or disturbance of the Stoneley waves causes reflection of the waves along the interface between the perforation walls into the reservoir R and the borehole fluids giving rise to typical chevron patterns or peaks of reflected waves. With the present invention, a measure of the perturbation consequences of the perforations in casing 22 on the Stoneley waves is assessed. The resultant measures are then used to assess the adequacy of the perforations P for facilitating open conduits for production from the fresh or undamaged portions of the reservoir R.

The well logging measurements of attenuation of the Stoneley direct waves and excess slowness (lower velocity) of such waves obtained by the well logging system L are recorded as functions of borehole depth in a suitable data memory of a computer/data processing system. Once recorded, the well logging data measurements may be transferred as needed into an input data for the data processing system.

Figure 3:
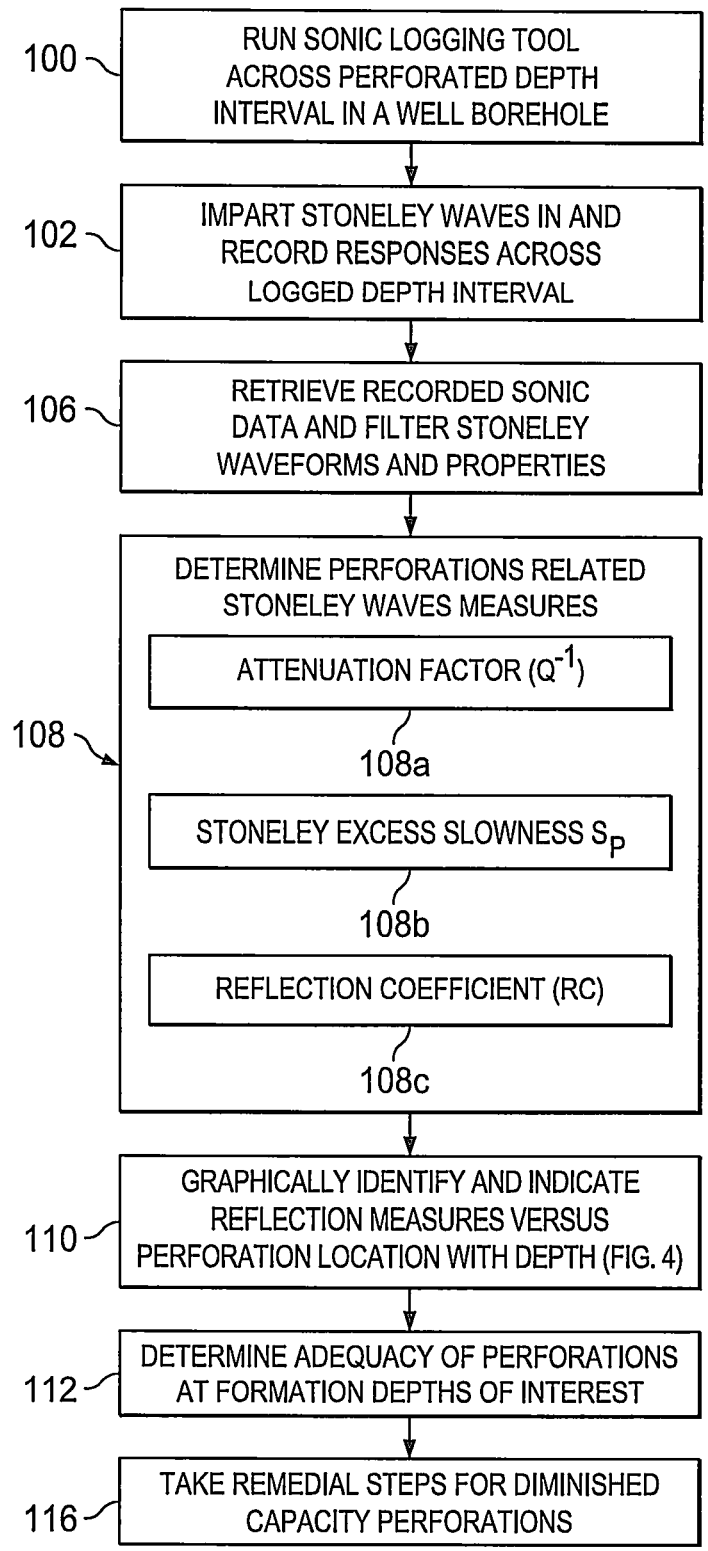
FIG. 3 is a schematic diagram of steps performed with the well logging tool in a cased wellbore of FIG. 2 in an operation according to the present invention for evaluation of cased hole perforations in a completed well in under-pressured tight gas and unconventional reservoirs.

FIG. 3 is a schematic diagram of steps with the apparatus of FIG. 1 in an operation according to the present invention for evaluation of cased hole perforations P in under-pressured gas reservoirs, such as shown at R in FIGS. 1 and 2. The processing sequence of FIG. 3 is performed separately for individual wells for evaluation of perforations.

As shown in step 100 of FIG. 3, the logging tool L is run in the well 10 to cover a depth interval of interest in the earth at the reservoir R where cased hole perforations P have been formed. As noted, the formation at the depth of interest is an under-pressured rock matrix of a producing sand containing gas. During step 102, sonic or acoustic energy is imparted with the source 14 to travel as acoustic energy wavelets into the well bore 20 and as Stoneley wavelets along walls of the casing 22.

As described above, the present invention utilizes Stoneley waves of the imparted acoustic energy for logging to detect effective perforations, or in effect the production capability of such perforations. As also indicated at step 102, the Stoneley wave travel time of the imparted source energy wavelets at the receivers 16 is recorded and transmitted to the surface over wireline cable 18 (or stored in the tool memory device downhole) for storage. During step 106, the recorded sonic or acoustic data are retrieved and subjected to preliminary noise reduction processing including conventional filtering. According to the present invention, Stoneley wave energy is in the form of acoustic energy wavelets that travel as boundary waves propagating along the fluid/solid interface between well bore fluids and the wall of the well casing 22.

Figure 5:
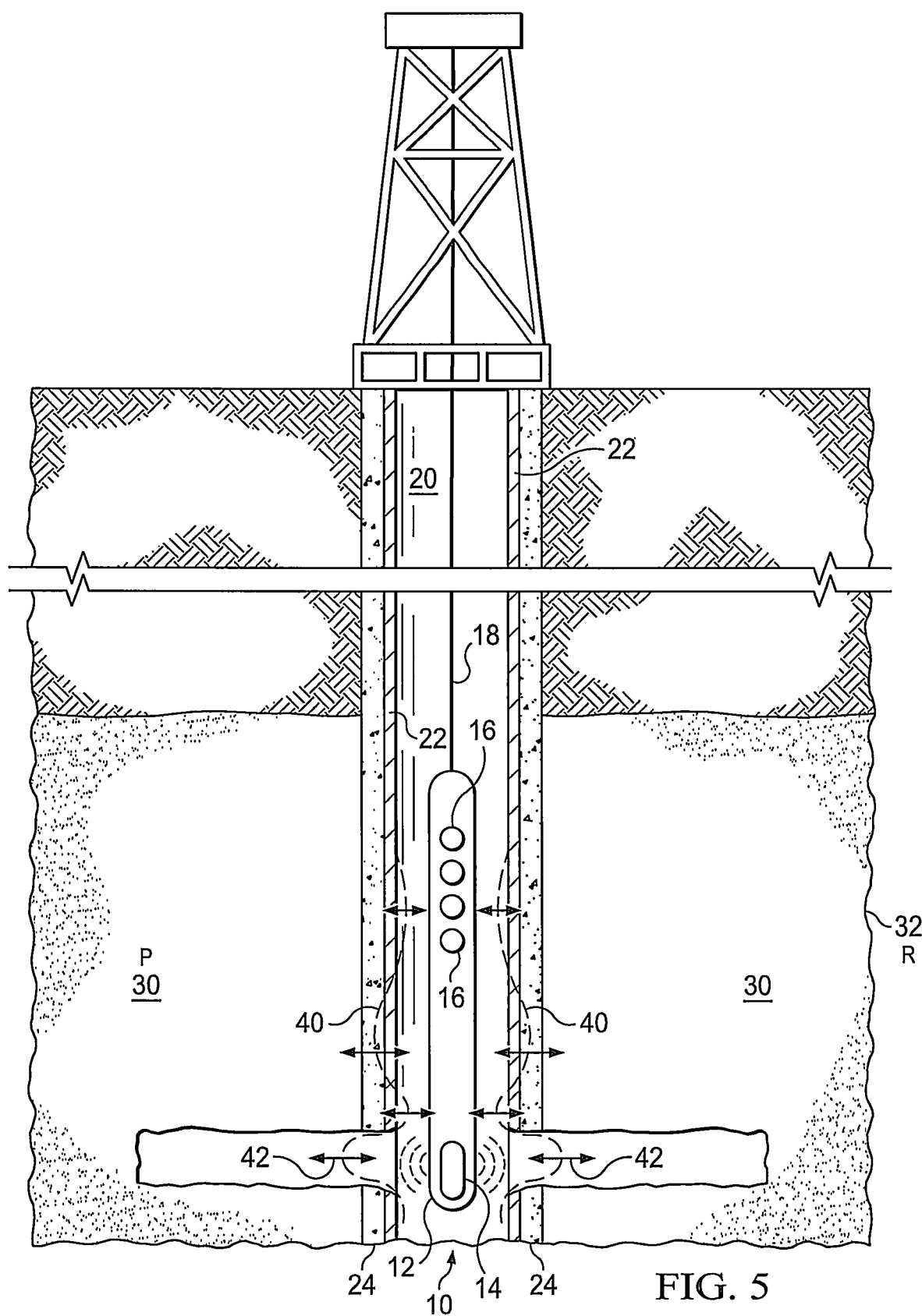
FIG. 5 is a schematic diagram of the well logging tool of FIG. 2 illustrating Stoneley wave propagation in a cased wellbore.

As shown at 40 in FIG. 5, the Stoneley wave travels along the well bore fluid/solid interface at casing 22. The Stoneley wave 40 exhibits a displacement indicated by arrows 42 during this travel. As also shown in FIG. 5, the magnitude of the Stoneley wave displacement, and thus the Stoneley wave, is based on permeability conditions in and near the wellbore 20. The Stoneley wave energy sensed at the receivers 16 has measurable amplitude and a measurable travel time.

At locations of cased well perforations 32 in the well, as shown in FIG. 5, the Stoneley wave 40 exhibits increased attenuation due to higher permeability of an effective, unblocked perforation 32. The velocity of travel of the Stoneley wave along the interface at cased well perforation locations such as 32 decreases in the more permeable formation. Conversely, the slowness, (inverse of velocity) increases.

The Stoneley wave travel along the fluid/solid interface at the wall of borehole at the perforation P is thus significantly affected due to fluid in the cased hole perforations. The Stoneley wave travel time is slowed due to the presence of perforations P in the casing 22 and thus comparably lower velocity and thus higher slowness.

During step 108, measures at the depth of interest are determined of perforation related Stoneley waves measures according to the present invention. Among these measures is the slowness (inverse of velocity) of the Stoneley wave travel from the source 14 to the receivers 16.

With the present invention, three parameters during step 108 regarding the travel of Stoneley waves are determined from the acoustic energy signals received by the well logging system L and plotted with depth against location of perforations (FIG. 4) and used as measures of the effectiveness of the perforations P. The three parameters are Attenuation ($Q^{-1}$) determined as indicated at step 108a; Slowness (S) determined as indicated at step 108b; and Reflection Coefficient (RC) determined as indicated at step 108c and graphically detected from the occurrence of chevron wave forms at effective/intact perforations.

Attenuation

Attenuation ($Q^{-1}$) according to the present invention is defined as the loss of energy measured over a period of time (during the logging) manifested as decaying amplitudes along the wavelet due to geometrical dispersion and energy absorption by the medium (Escandon, Carlos & and Montes, (2010) Detecting and Characterizing Fractures in Sedimentary Deposits with Stoneley waves. CT&F—Ciencia, Technologia y Futuro—Vol. 4 Num. 2 Dec. 2010). Attenuation is calculated from the ratio of two measured contiguous peak amplitudes separated by one period of time t. Thus where $U_t$ is peak amplitude at time t and $U_{(t+\tau)}$ is the peak amplitude after a period (t+τ), $Q^{-1}$ is calculated from Equation (1) as follows:

$$Q^{-1} \approx \ln(U_t/U_{(t+\tau)}) \quad (1)$$

Figure 4C:
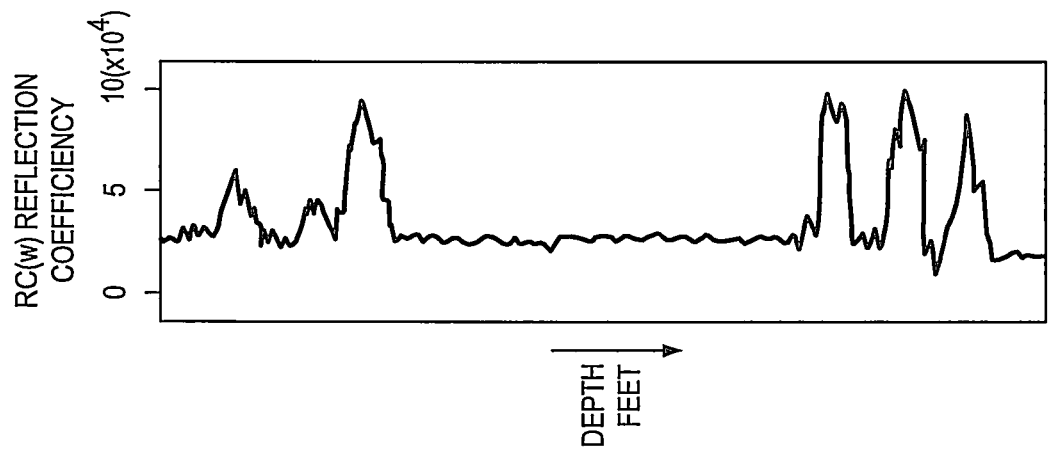
FIGS. 4A, 4B, 4C, and 4D are schematic diagrams of example plots of measures of physical phenomena formed according to the present invention as a function of well depth regarding production capability of cased hole perforations in a cased completed well in an under-pressured gas producing reservoir.
Figure 4A:
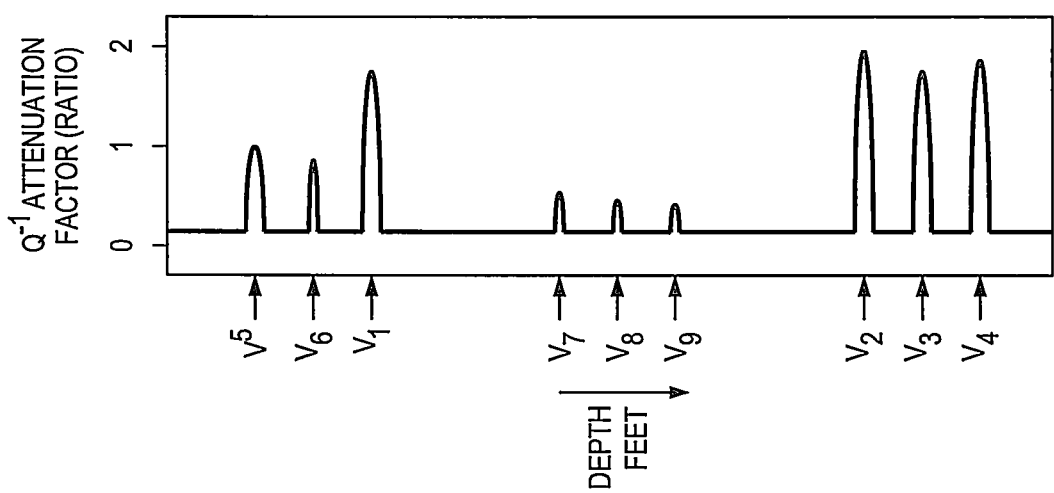

The results of an example determined attenuation $Q^{-1}$ are plotted as a function of well depth along a logged interval where there are cased well perforations (FIG. 4A).

Slowness

According to the present invention, Stoneley excess slowness due to open permeable perforation is identified as $S_p$.

Excess slowness occurs due to the wave travelling from a non-permeable (such as the intact casing 22 in the current invention) to a permeable medium (in the current invention an effective and intact perforation P that is in good communication with fresh formation). Slowness estimation according to the Equation (2) is applied according to Chang et al, 1988, "Low Frequency Tube Waves in Permeable Rocks," Geophysics, 46, 1042-1053, and Latifa, et al. 2001, "Permeability Determination from Stoneley Waves in the Ara Group Carbonates, Oman. GeoArabia 6 (4): 649-666."

$$Sp^2 = S^2 - Se^2 \quad (2)$$

In Equation (2), S is Stoneley slowness measured by the logging system L and Se is the Stoneley slowness at zero frequency associated to the wave effect in the well. Stoneley slowness $S_e$ at zero frequency is calculated from the drilling mud density $\rho_m$, the volumetric module $K_m$ of the drilling mud, and the matrix shear modulus G using Equation (3):

$$S_e^2 = \rho_m \left[ \frac{1}{K_m} + \frac{1}{G} \right] \quad (3)$$

Figure 4D:
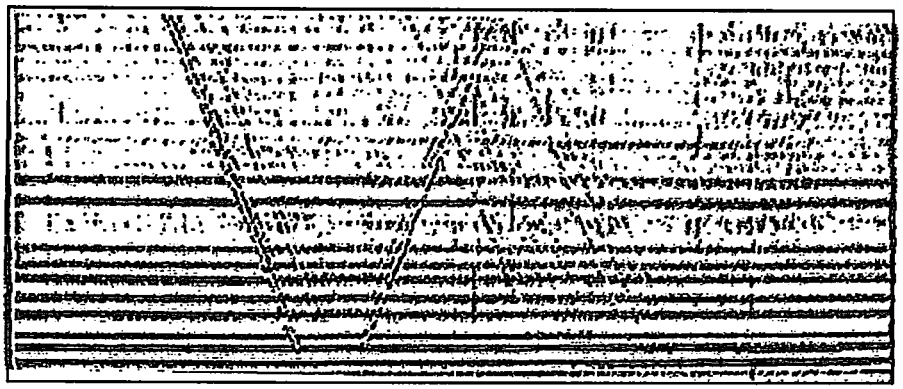
Figure 4B:
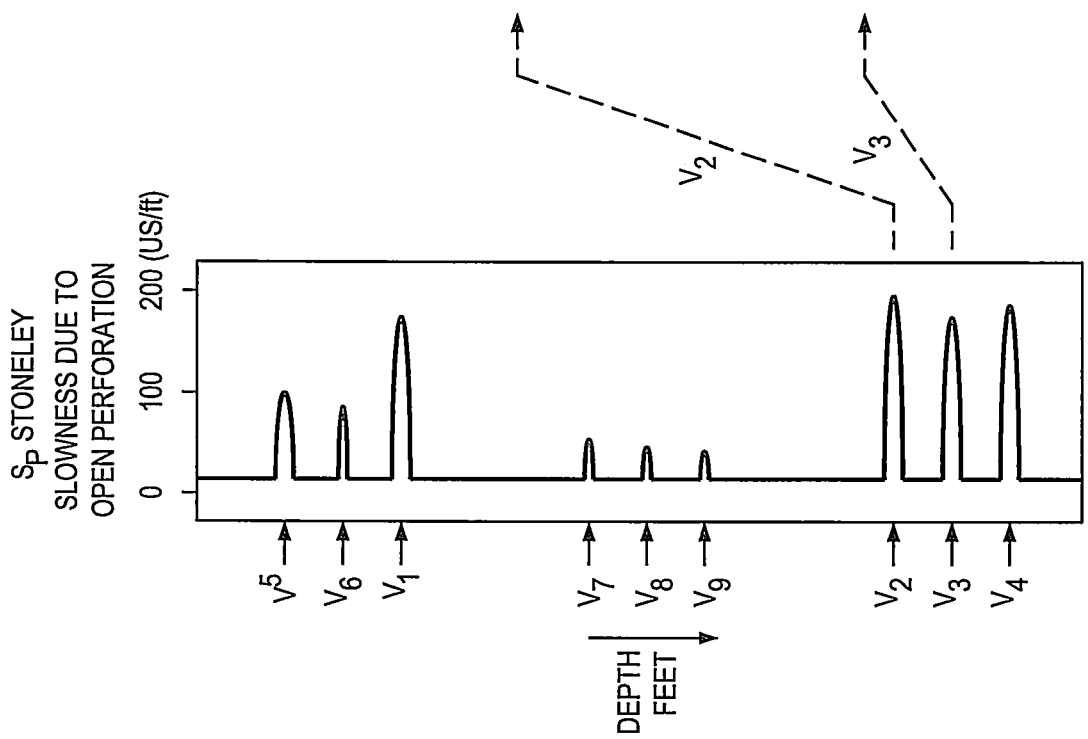

The mud density $\rho_m$ and the volumetric module $K_m$ are known in any particular well from the drilling fluids design used in that particular well. The formation (matrix) shear modulus G can be assessed from core rock mechanical testing, and/or open hole logs obtained for the well before it was cased or from offset wells with the same formation. FIG. 4B is a plot of Stoneley slowness $S_e$ as a function of well depth near cased well perforations.

Reflection Coefficient

Reflection coefficient (RC) according to the present invention is the ratio of reflected wave amplitude (R(w)) sensed during logging at a depth of interest to the direct wave amplitude (D(w)) according to Equation (4):

$$RC(w) = R(w)/D(w) \quad (4)$$

An example plot of Reflection Coefficient R(w) as a function of well depth near cased borehole perforations is shown in FIG. 4C.

Step 110 involves formation by suitable graphic display of slowness, attenuation, and reflection coefficient measures versus perforation location as a function of well depth. As discussed above, FIGS. 4A, 4B, and 4C are example plots of such measures at an example location of cased well perforations. The displays of FIGS. 4A, 4B, and 4C are a prophetic example of such plots over common depths in a well which illustrate the impact of different perforations ($V_1$ through $V_9$) on slowness, attenuation and reflection coefficient. FIG. 4D illustrates the occurrence of chevron reflection patterns versus perforation location or depth in the well 10 at an enlarged scale from FIGS. 4A through 4C. The data plotted in FIG. 4D are plots of reflected Stoneley wave track amplitude such as sensed by receivers 16 as a function of borehole depth in the well near where perforations $V_2$ and $V_3$ are located. The chevron pattern evident in the traces of FIG. 4D caused by the presence of cased well perforations at these depths is visually evident from plotting the reflected Stoneley wave traces versus depth and location of perforations downhole.

Accordingly at step 112, an assessment of the effectiveness of the cased hole perforations P, or in effect the production capability of the reservoir is made based on the obtained measure of slowness of travel of the imparted acoustic energy along the walls of the well bore at the formations of interest. This determination is based on a quantitative measure which is basically the contrast between the Stoneley wave slowness of the cased hole with no perforation, and the slowness where there are perforations, as is described below.

The resulting contrast between the fluid pressure dissipation in un-perforated cased hole wall and the fluid pressure dissipation through communicating (effective) perforation with the reservoir, particularly in an under-pressured reservoir or pay zone is significant enough to impact the Stoneley wave slowness or travel time, attenuation, and reflection.

Under a specific environment and hole condition and formation the travel time (slowness), attenuation and reflection coefficient and reflection pattern are affected by:
   (a) Presence of intact and open effective perforation;
   (b) Degree of imbalance of pressure between fluids in the hole and fluids in the reservoir; and
   (c) Formation fluids, gas increases the travel time (slowness) compared to oil or water.

The intact perforations form permeability conduits in cased sandstone of reservoir R and are communicating the well 10 with the formation. The intact perforations are expected to impact Stoneley wave propagation in at least the following ways:
   (a) Partial reflection at sharp impedance contrasts defined by the perforation boundaries;
   (b) Stoneley wave velocity is inversely related to permeability of fluid through the perforations, i.e. velocity decreases in good perforation zones resulting in increased wave dispersion;
   (c) Higher permeability zones along good perforation intervals result in higher attenuation of Stoneley waves; and
   (d) Lower formation pressure (pore pressure) zones in the perforated formation result in higher attenuation and dispersion of Stoneley waves.

Stoneley wave slowness has been found to become larger in permeable natural fractures and rock layers. The present invention utilizes this physical principle based on Stoneley wave energy travel to detect a level of efficiency of artificially induced perforations in a cased borehole of gas reservoirs, particularly the under-pressured gas reservoirs where the impact is expected to be optimum.

FIGS. 4A and 4B are schematic plots of prophetic perforations-related Stoneley waves measures of Attenuation Factor and Stoneley Slowness, respectively, according to the present invention formed in step 110 to indicate effectiveness of casing perforations. In FIG. 4D, chevron reflection patterns $V_2$ and $V_3$, as noted are plotted as functions of well depth at locations of casing perforations. It is evident from the plots in FIGS. 4A and 4B that the casing perforations indicated by reflection patterns $V_1$, $V_2$, $V_3$ and $V_4$ display highest effectiveness measures, both Attenuation Factor $Q^{-1}$ and Stoneley Slowness $S_p$. The casing perforations indicated by reflection patterns $V_5$ and $V_6$ display intermediate or medium effectiveness. In contrast, the casing perforations indicated by reflection patterns indicated by reflection patterns $V_7$, $V_8$ and $V_9$ indicate collapsed or otherwise ineffective perforations.

The perforation related Stoneley waves measures according to the present invention including Stoneley slowness, attenuation, and reflection coefficient are expressed by Equations (1) through (4) above. The perforation related Stoneley waves measures according to the present invention offer a measure to assess effectiveness of perforations in the hole.

As indicated at step 116, remedial steps are then taken for diminished capacity perforations such as collapsed or otherwise ineffective perforations. The remedial steps taken during step 116 include re-perforating zones in the borehole where existing perforations have diminished capacity at the formation depths of interest.

The present invention thus utilizes well logging with Stoneley waves to detect effective perforations in under-pressured sandstone reservoirs. Example reservoirs may be found in what are known as Northern Arabia sandstones and shale. The present invention uses the characteristics of Stoneley waves (e.g. travel time) recorded from a dipole shear or array sonic (full waveform) acoustic log.

The current invention extends the application of full wave sonic logging (including Stoneley waves logging) to address perforation integrity and efficiency, and thus gas producing capabilities in under-pressured tight sand and shale reservoirs.

The present invention permits assessments of the integrity and effectiveness of cased holes perforations in communicating with under-pressured reservoirs prior to incurring costs on production tests and/or hydro-fracturing. This saves time and money otherwise potentially wasted in conducting production tests in formations with lower quality poor perforations.

The present invention prevents hydrocarbon asset loss due to unknowingly bypassing gas resources due to ineffective perforations.

The invention has been sufficiently described so that a person with average knowledge in the field of reservoir modeling and simulation may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there can be improvements and modifications made of the present invention described in detail above without departing from the spirit or scope of the invention as set forth in the accompanying claims.

What is claimed is:

1. A method of testing production capability of cased hole perforations through a casing lining a completed well in a gas producing reservoir formation, comprising the steps of:
   a) moving a well logging sonde in a well bore of the completed well in the reservoir across a depth interval of interest which covers the cased hole perforations in the casing, the well logging sonde having therein an acoustic energy source and acoustic energy receivers;
   b) imparting acoustic energy waves with the acoustic energy source in the sonde at the depth interval of interest to travel as Stoneley wave energy along walls of the casing in the completed well;
   c) sensing with the acoustic energy receivers the time of travel of the imparted acoustic energy waves as Stoneley wave energy along the walls of the casing in the completed well;
   d) sensing with the acoustic energy receivers the amplitude of the acoustic energy waves as Stoneley wave energy along the walls of the casing in the completed well;
   e) obtaining a measure of the slowness of travel of the imparted acoustic energy waves travelling as Stoneley wave energy along the walls of the casing in the completed well at the depth interval of interest;

f) obtaining a measure of the attenuation in amplitude of the imparted acoustic waves travelling as Stoneley wave energy along the walls of the casing in the completed well at the depth interval of interest;

g) obtaining a measure of the reflection coefficient of the imparted acoustic waves during travel as Stoneley wave energy along the walls of the casing in the completed well at the depth interval of interest;

h) determining the production capability of the cased hole perforations through the casing at the formation depths of interest based on:
   (1) the obtained measure of the attenuation of the imparted acoustic waves during travel as Stoneley wave energy along the walls of the casing in the completed well at the depth interval of interest; and
   (2) the obtained measure of the reflection coefficient of the imparted acoustic waves during travel as Stoneley wave energy along the walls of the casing in the completed well at the depth interval of interest;

i) taking remedial steps in the cased completed well based on the determined production capability of the cased hole perforations through the casing at the formation depths of interest.

2. The method of claim 1, wherein the step of taking remedial action comprises the step of re-perforating the casing at the formation depths of interest.

3. The method of claim 1, wherein the step of taking remedial action comprises the step of forming an additional perforation through the casing at one of the formation depths of interest.

4. The method of claim 1, wherein the step of obtaining a measure of the slowness of travel of the imparted acoustic energy waves during travel as Stoneley wave energy is performed based on the sensed time of travel of the imparted acoustic energy waves along the walls of the casing.

5. The method of claim 1, wherein the step of obtaining a measure of the attenuation of the imparted acoustic waves during travel as Stoneley wave energy is performed based on the sensed amplitude of the acoustic energy waves along the walls of the casing.

6. The method of claim 1, wherein the gas producing reservoir at the depth interval of interest is an under-pressured gas reservoir.

7. A method of testing effectiveness of cased hole perforations through a casing lining a completed well in a gas producing reservoir formation, comprising the steps of:

a) moving a well logging sonde in a well bore of the completed well in the reservoir across a depth interval of interest which covers the cased hole perforations in the reservoir, the well logging sonde having therein an acoustic energy source and acoustic energy receivers;

b) imparting acoustic energy waves with the acoustic energy source in the sonde at the depth interval of interest to travel as Stoneley wave energy along walls of the casing in the completed well;

c) sensing with the acoustic energy receivers the time of travel of the imparted acoustic energy waves as Stoneley wave energy along the walls of the casing in the completed well;

d) sensing with the acoustic energy receivers the amplitude of the acoustic energy waves as Stoneley wave energy along the walls of the casing in the completed well;

e) obtaining a measure of the slowness of travel of the imparted acoustic energy waves travelling as Stoneley wave energy along the walls of the casing in the completed well at the depth interval of interest;

f) obtaining a measure of the attenuation in amplitude of the imparted acoustic waves travelling as Stoneley wave energy along the walls of the casing in the completed well at the depth interval of interest;

g) obtaining a measure of the reflection coefficient of the imparted acoustic waves during travel as Stoneley wave energy along the walls of the casing in the completed well at the depth interval of interest;

h) determining the production capability of the cased hole perforations at the formation depths of interest based on:
   (1) the obtained measure of the attenuation of the imparted acoustic waves during travel as Stoneley wave energy along the walls of the casing in the completed well at the depth interval of interest; and
   (2) the obtained measure of the reflection coefficient of the imparted acoustic waves during travel as Stoneley wave energy along the walls of the casing in the completed well at the depth interval of interest;
   (3) the obtained measure the slowness of travel of the imparted acoustic energy waves travelling as Stoneley wave energy along the walls of the casing in the completed well at the depth interval of interest;

i) taking remedial steps in the cased completed well based on the determined production capability of the cased hole perforations at the formation depths of interest.

* * * * *